United States Patent [19]
Brunner et al.

[11] Patent Number: 5,982,775
[45] Date of Patent: Nov. 9, 1999

[54] FORWARDING MULTICAST FRAMES ON AN ETHERNET BRIDGE

[75] Inventors: Theodore O. Brunner, Portland; Dennis B. Thomas, Beaverton, both of Oreg.

[73] Assignee: Tektronix, Inc., Wilsonvillle, Oreg.

[21] Appl. No.: 08/911,308

[22] Filed: Aug. 14, 1997

[51] Int. Cl.⁶ .................................................. H04L 12/46
[52] U.S. Cl. ............................................ 370/401; 370/432
[58] Field of Search .................................. 370/401–405, 370/432

[56] References Cited

U.S. PATENT DOCUMENTS

| | | | |
|---|---|---|---|
| 5,528,588 | 6/1996 | Bennett et al. | 370/60 |
| 5,608,726 | 3/1997 | Virgile | 370/401 |
| 5,684,800 | 11/1997 | Dobbins et al. | 370/432 |
| 5,818,838 | 10/1998 | Backes et al. | 370/401 |

OTHER PUBLICATIONS

"Host Extensions for IP Multicasting" S. Deering, Stanford Univ. Aug. 1989.

"Multicast Routing in Internetworks and Extended LANs", Stephen E. Deering Computer Systems Laboratory, Stanford Univ. 1988, ACM 0–89791–279–9/88/008/0055.

"CGMP: Enabling IP Multicasting in Layer 2 Switching Environments" Posted: Wed Nov. 6 19:00:53 PST 1996.

*Primary Examiner*—Chau Nguyen
*Assistant Examiner*—Frederic D. Wolkow
*Attorney, Agent, or Firm*—Francis I. Gray

[57] ABSTRACT

Forwarding of multicast data frames over an Ethernet bridged network infrastructure is performed by storing in a bridge forwarding table the multicast destination address when the hosts are polled via the bridge by a router. Then when a multicast data frame is received by the bridge, the forwarding table is searched and the frame is forwarded to each port of the bridge that corresponds to a host that subscribed to the particular multicast session indicated by the multicast destination address.

2 Claims, 3 Drawing Sheets

FORWARDING MULTICAST FRAMES ON AN ETHERNET BRIDGE

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates to networks, and more particularly to forwarding multicast frames over an Ethernet bridged network infrastructure.

An Ethernet network with a bridged infrastructure improves networking performance, i.e., bandwidth, by separating point to point or unicast traffic. Such a network, as shown in FIG. 1, has one or more hosts coupled to a hub or common bus, with one hub being coupled to another via a bridge or switch. The bridge in turn is coupled via a router to the rest of the world, i.e., to the Internet, for example. However the bridged infrastructure does not separate, and thus improve the performance of, many to many or multicast traffic because the bridge, and hosts, treat multicast traffic as if it were broadcast traffic and floods it to all hosts. On the Ethernet network an Internet Protocol(IP)-multicast packet is encapsulated in an Ethernet multicast frame so that the IP-multicast packet shares the fate of the Ethernet multicast frame and is broadcast over the entire Ethernet bridged infrastructure.

A frame of data has a header, which includes an address space with a source address (the originator of the frame) and a destination address (the target of the frame), followed by data. For multicast traffic a network multicast packet is encapsulated within the frame as part of the data. The bridge does not look at the encapsulated network multicast packet, but merely at the source and destination addresses of the data frame header. The bridge maintains a forwarding table in which it contains a source address and a port of the bridge to which the source is coupled. The destination address of a frame is searched for within the forwarding table, and when found the frame is sent through the corresponding port to the host that has the destination address. If not found, the frame is broadcast—it is transmitted through all ports except the port on which it arrived. For broadcast frames, i.e., frames that are intended to be transmitted to all hosts, the destination address is tested to see if it falls within the broadcast address range, and if so the bridge broadcasts the frame. The bridge does not recognize multicast addresses, so multicast frames also are broadcast by the bridge.

The Ethernet system has 48 bits of address space that are divided up into:

(1) a broadcast address;
(2) multicast addresses; and
(3) unicast addresses.

The unicast addresses are the normal addresses, each address being assigned uniquely to a single board coupled to the network. A data frame addressed to a unicast address is forwarded by the bridge to the host to which the unique board identified by that address is coupled, while a data frame addressed to the broadcast address is forwarded to all hosts, and thence to all boards. But a multicast address is treated by the bridge as an unrecognized unicast address and broadcast.

The first facet of the problem in dealing with multicast addresses is on the host. Any frame addressed to a multicast address is received by every host, so that hosts that interface with the network may be interrupted for every multicast frame that appears on the hub, whether it is destined for them or not. This may be a major performance drain.

Next the bridge does not read the network level addresses that are encapsulated in the data frame, doing all its work at the data frame level, i.e., reading the data frame header. The bridge attempts to filter data frames between several hubs, each hub having one or more hosts attached to it. The bridge listens to source addresses on each hub and remembers on which bridge port it received such an address. The bridge then maintains a forwarding table which associates source address with the port on which it was heard. When it receives a data frame destined for a particular address, it searches its forwarding table to find a destination port. The bridge forwards the data frame to that port, if found, filtering the data traffic. If the bridge does not have the destination address in the forwarding table, or otherwise does not recognize the address, it treats the destination address as a broadcast address and outputs the data frame to every port. Thus bridges treat the multicast frames like broadcast frames.

Using a protocol entitled IGMP (Internet Group Management Protocol), as described in the Network Working Group Request for Comments (RFC) 1112, Appendix I (August 1989), hosts subscribe to a multicast session when they are polled by a router with a well-known specific multicast address. The multicast address from the router must be passed via the bridge as a broadcast frame to every host on every hub. If one or more of the hosts want to be part of a multicast session, the host or hosts respond by providing the address of the multicast session to which they want to subscribe. This information must be passed by the bridge back up to the router. If none of the hosts coupled to the bridge subscribe to a multicast session, then the router, when it receives a multicast frame, bypasses that bridge. However if one of the hosts coupled to the bridge subscribes to the multicast session, then the multicast frame is transmitted to the bridge which in turn, as discussed above, treats it as a broadcast frame and each host coupled to the bridge in turn accepts it as a broadcast frame.

There have been some attempts to solve this problem recently. Cisco Systems, Inc. of San Jose, Calif. sells bridges that work with a router which recognizes the network multicast address and performs the multicast polling at the router (network) level using a proprietary protocol between the bridge and the router.

Stephen Deering, in a 1988 paper entitled "Multicast Routing in Internetworks and Extended LANs" published by the Association for Computing Machinery, describes one technique prior to the IGMP protocol for multicasting in a simple bridged LAN using membership reports and a forwarding table algorithm. However the article does not describe how the bridge operates under the IGMP protocol, specifically what the interaction should be between the bridge and a router.

What is desired is a solution to the multicast problem in an Ethernet bridged network infrastructure using the IGMP protocol that assures that multicast frames are received only by subscribers to that multicast session without the use of proprietary hardware bridges or protocols.

SUMMARY OF THE INVENTION

Accordingly the present invention provides for forwarding multicast frames over a bridge in an Ethernet network infrastructure by using multicast destination addresses from a data frame to augment a forwarding table within the bridge to support multicasting. When a bridge sees a multicast address in a destination field of the data frame, it knows that the originating host is a subscriber to that multicast session and also wants to receive all data frames destined for that multicast address. The bridge enters the multicast address together with the source port into the forwarding table. The bridge then searches the forwarding table for the destination address and forwards the message to each port which has the corresponding multicast address in the forwarding table. Thus the bridge forwards a multicast data frame only to selected ports rather than broadcasting the multicast data frame to all ports.

The objects, advantages and other novel features of the present invention are apparent from the following detailed description when read in conjunction with the appended claims and attached drawing.

DESCRIPTION OF THE PREFERRED EMBODIMENT

Figure 1:
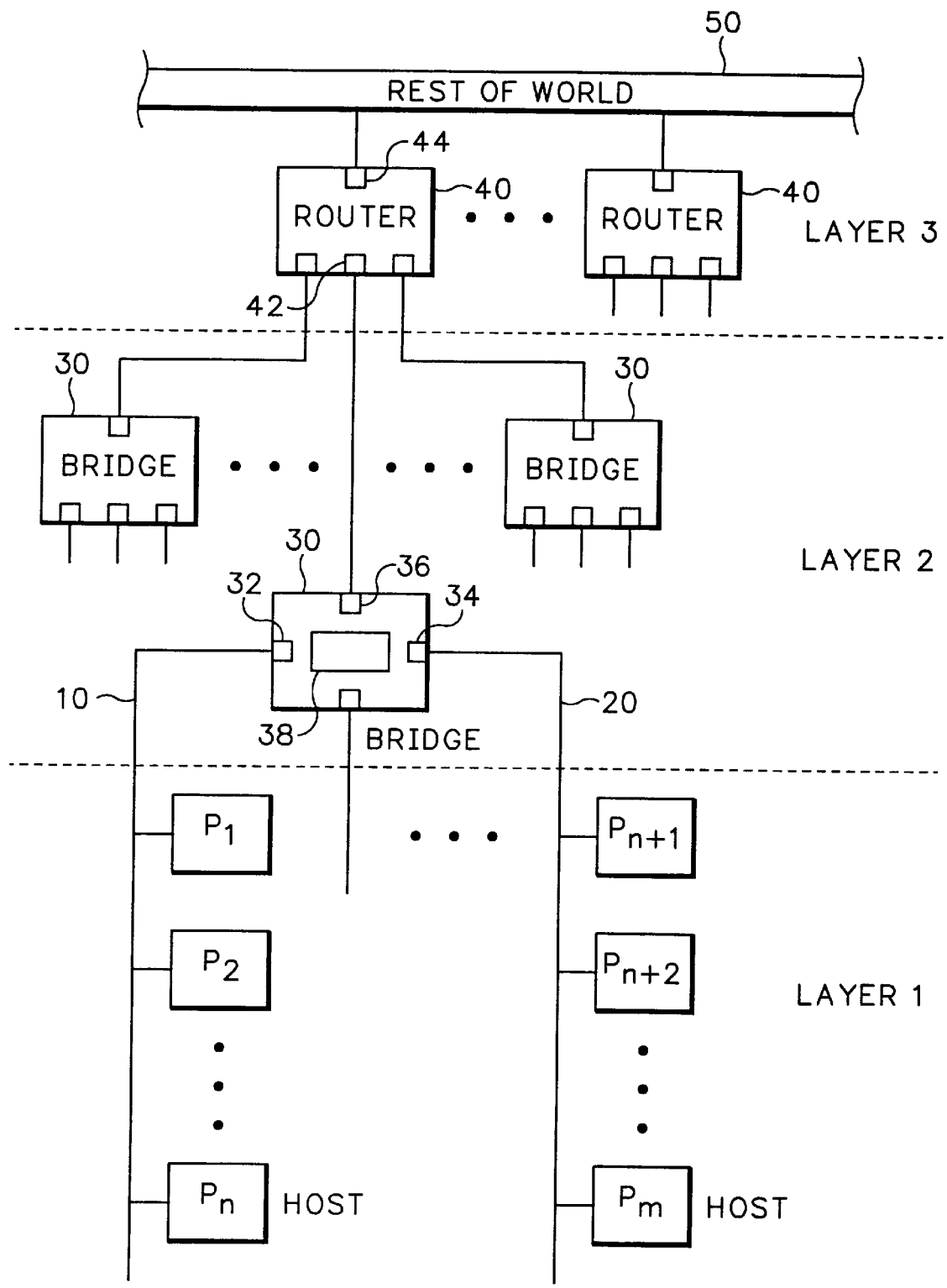
FIG. 1 is a block diagram of an Ethernet bridged network infrastructure for practicing the present invention.

Referring to FIG. 1 one or more hosts P1–Pn are coupled together on one hub 10, and one or more hosts P(n+1)–Pm are coupled together on another hub 20, etc. The hubs 10–20 are coupled together via a bridge 30 having a port 32, 34 for each hub. The bridge 30 in turn is coupled via another port 36 to a router 40 at a router port 42. Another router port 44 is coupled to the rest of the world 50, i.e., other routers via the Internet. Each bridge 30 has a forwarding table 38 that it maintains. The bridge maintains the forwarding table by looking at all of the data frame traffic on the hubs 10–20 coupled to it. If the data frame has a broadcast destination address, the bridge 30 transmits the frame to all of its ports 32–36 except the one on which the frame was received so that all hosts P1–Pm receive the frame. If the data frame has a unicast destination address, the bridge 30 enters the source address identifying the frame originator and the corresponding port 32–36 into the forwarding table 38. Then the bridge 30 searches the forwarding table 38 to find an address corresponding to the destination address in the frame. If the destination address is found, the data frame is transmitted to the associated port 32–36 and the single host P1–Pm having that unique address receives the frame. If the destination address is not found, the data frame is broadcast. This is conventional bridge processing.

However if the frame has a multicast destination address, the bridge 30 now recognizes it as a multicast data frame from the multicast address and enters the destination address, i.e., the multicast subscription address, and corresponding port 32–36 into the forwarding table 38. Since the hosts P1–Pm respond to the router multicast polling passed through the bridge 30 by transmitting a multicast subscription frame, each hub 10–20 that has a host that subscribes to a particular multicast address is entered into the forwarding table 38. Then a search on the destination address may have more than one hit, i.e., more than one port 32–36 may have at least one host P1–Pm that has subscribed to that multicast session. The multicast data frame is then sent to each port 32–36 that has a subscribing host P1–Pm for that multicast address except the port on which it arrived. In this manner a multicast frame is only transmitted by the bridge 30 to the hubs 10–20 that have subscribing hosts P1–Pm, rather than to all ports, and each host only responds if it is a subscriber to the particular multicast session. Thus nonsubscribing hosts P1–Pm are not interrupted by multicast data frames as they are by broadcast data frames.

Figure 2A:
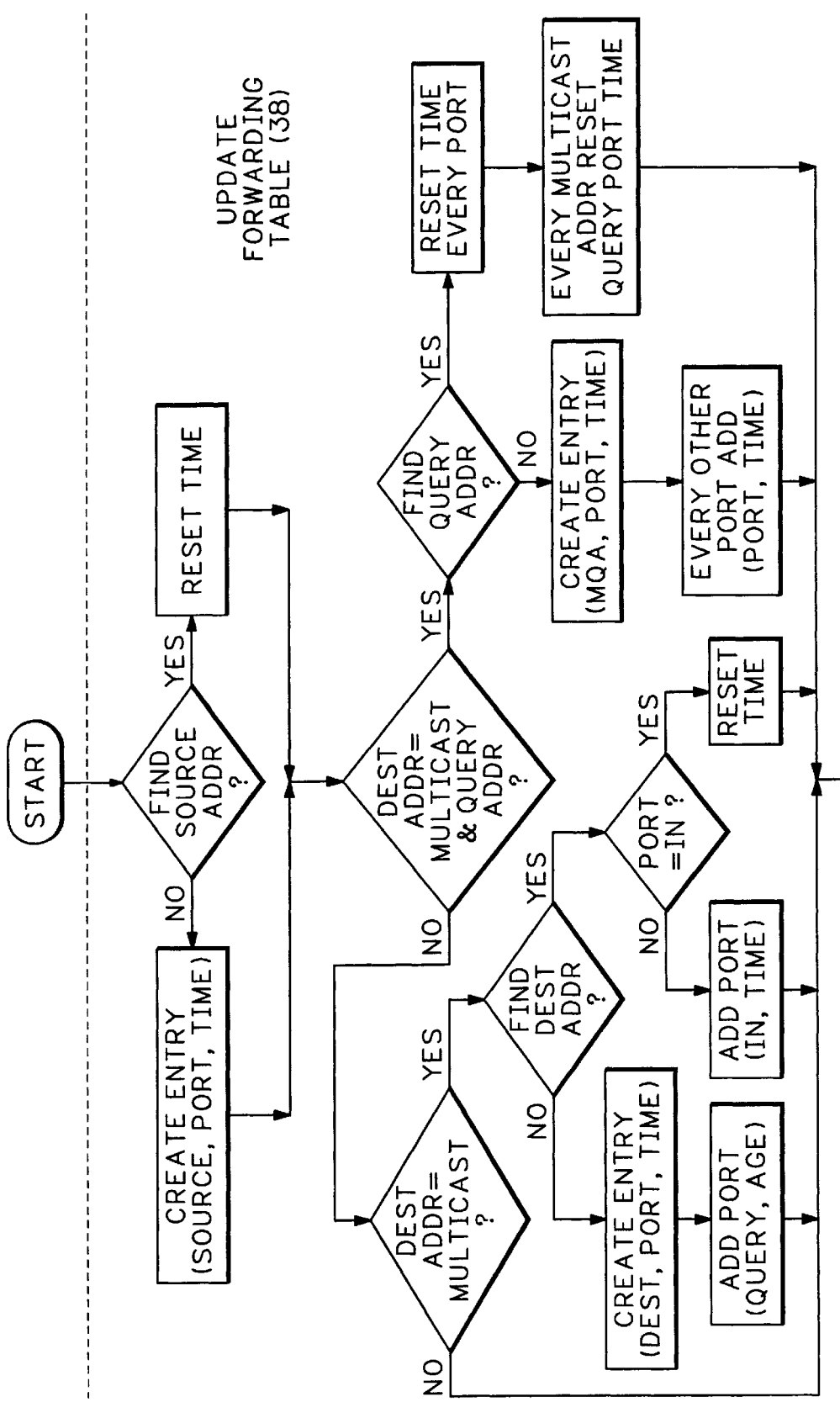
FIG. 2 is a flow chart diagram for the forwarding of multicast frames over the Ethernet bridged network infrastructure of FIG. 1 by a bridge according to the present invention.
Figure 2B:
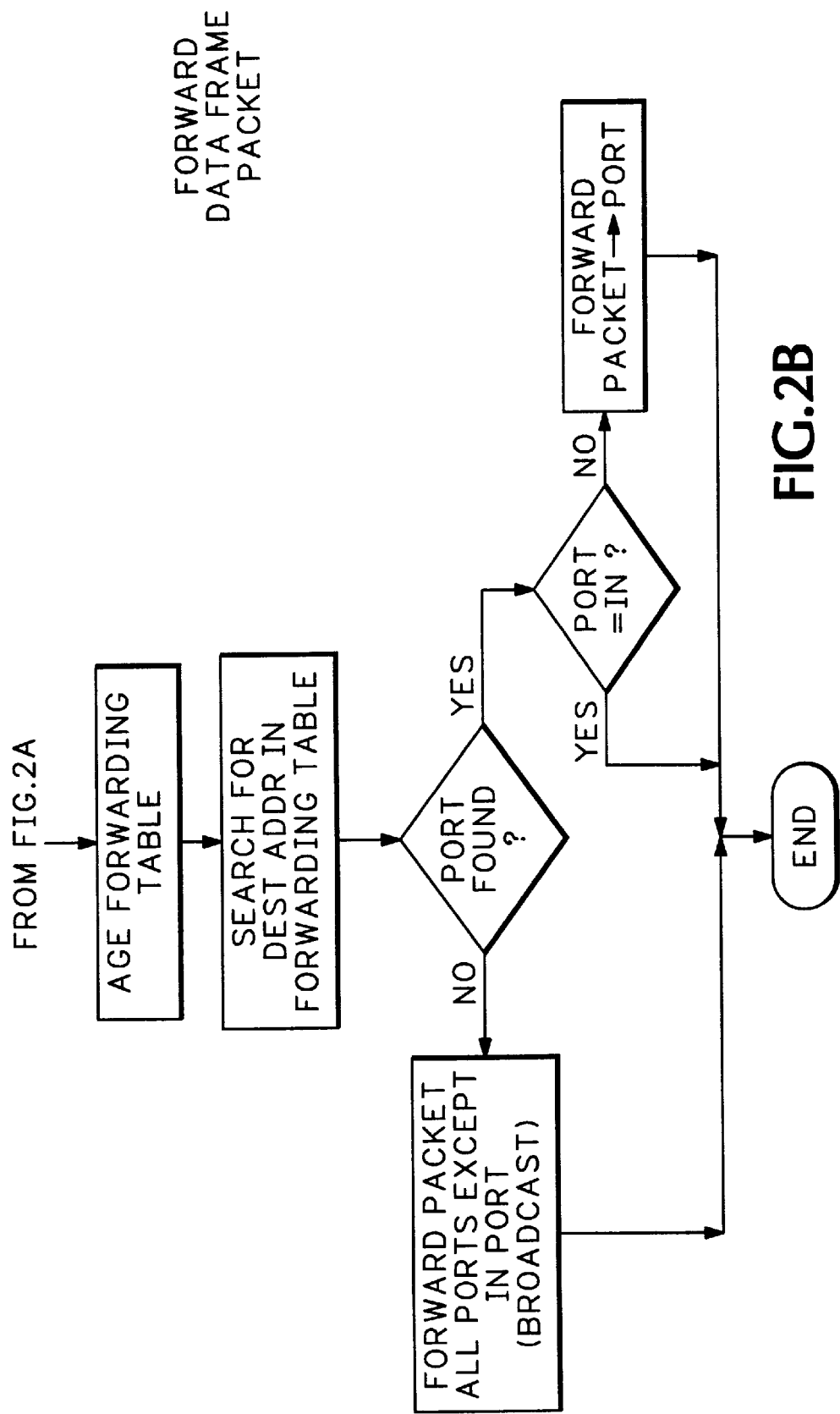

The process is more clearly described with reference to FIG. 2 and the following bridging code.

---

*Bridging Code with Multicast Forwarding*

```
forwarding table is a list of entries of the following types:
   (unicast-address, (port, age))
   (multicast-address, (port, age), (port, age) . . . (query-port, age))
including the permanent entry:
   (query-address, (1, age),(2, age) . . . (N, age))
main_loop
(
   update_forwarding_table( )
   age_forwarding_table( )
   forward_packet( )
)
update_forwarding_table(in_port, source_addr, destin_addr, curr_time)
(
   if find_entry(source_addr)
   (
      for only port
         reset_port_time(curr_time)
   )
   else /*its a new address*/
   (
      create_entry(source_addr, in_port, curr_time)
   )
   if (destin_addr = multicast_addr & multicast_query_addr)
   (
      if find_entry(multicast_query_addr)
      (
         for every port
            reset_port_time(curr_time)
         for every multicast-address entry
            for query_port
               reset_port_time(curr_time)
      )
      else /*its a new entry*/
         create_entry(multicast_query_addr, in_port, curr_time)
         for every other port on bridge
      add_port(port, curr_time)
   )
   remember query_port = in_port
)
else if(destin_addr = multicast_addr)
(
   if find_entry(destin_addr)
   (
      if find_port(in_port)
      (
         reset_port_time(curr_time)
      )
      else /*its a new port*/
      (
         add_port(in_port, curr_time)
      )
   )
   else /*its a new entry*/
   (
      create_entry(destin_addr, in_port, curr_time)
      add_port(query_port, query_port_age)
   )
)
)
age_forwarding_table( )
(
   for all_addresses
      for all_ports
```

-continued

*Bridging Code with Multicast Forwarding*

```
        if(curr_time - entry_time > 15 minutes)
            remove port;
)
forward_packet(in_port, source_addr, destin_addr)
(
  port = search_in_forwarding_table(destin_addr)
  if (port was found)
  (
    /*have a forwarding table hit*/
    for all ports in entry
        if (port == in_port)
        (
            /*don't do anything, its already there!*/
        )
        else
        (
            forward_packet_out(port);
        )
    )
  else if (port was not found) or if (destin_addr = broadcast_addr)
  (
    /*broadcast it*/
    for every port except in_port
        forward_packet_out(port);
  )
)
```

Thus the present invention provides forwarding of multicast data frames on a bridge in an Ethernet bridged network infrastructure by entering multicast destination addresses in the forwarding table as well as source addresses and then searching the addresses for a match with the destination address, forwarding the multicast data frame to all ports that have subscribers to the addressed multicast session.

What is claimed is:

1. A method of forwarding multicast data frames over an Ethernet bridged network infrastructure of the type having a bridge coupled to a router which is in turn coupled to an internet, the bridge having a plurality of ports with one or more hosts coupled to each port, comprising the steps of:

periodically polling the hosts via the bridge from the router with a specific multicast address;

each host responding to the polling step by transmitting a multicast frame with a multicast destination address for a particular multicast session if the host is subscribing to the particular multicast session;

storing in a forwarding table of the bridge the multicast destination address from the multicast data frame transmitted by the host for the particular multicast session together with the corresponding bridge port to which the host is coupled;

detecting at the bridge for each data frame available to the bridge whether the data frame is a multicast data frame;

searching the forwarding table for the multicast address; and forwarding the multicast frame to each bridge port for which there is a hit as a result of the searching step.

2. A method of forwarding multicast data frames over a bridge coupled to a router and having a plurality of ports to which hosts are coupled in an Ethernet bridged network infrastructure comprising the steps of:

passing a periodic polling command as a broadcast frame from the router to each port of the bridge to which hosts are coupled;

for each host that subscribes to a multicast session by responding to the polling command storing in a forwarding table a multicast destination address together with the bridge port to which the host is coupled;

searching the forwarding table for each data frame available to the bridge as a multicast data frame for the multicast address; and forwarding the multicast frame to each bridge port for which there is a hit as a result of the searching step.

* * * * *